United States Patent [19]

Barclay

[11] Patent Number: 6,158,658
[45] Date of Patent: *Dec. 12, 2000

[54] SYSTEM AND METHOD FOR MATCHING PASSENGERS AND THEIR BAGGAGE

[75] Inventor: John L. Barclay, Chanhassen, Minn.

[73] Assignee: Laser Data Command, Inc., Eden Prairie, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/918,127

[22] Filed: Aug. 27, 1997

[51] Int. Cl.⁷ .................................................. G07B 15/02
[52] U.S. Cl. ............................................ 235/384; 235/375
[58] Field of Search ........................... 235/384, 385, 235/375, 380, 382

[56] References Cited

U.S. PATENT DOCUMENTS

| | | | |
|---|---|---|---|
| 4,488,035 | 12/1984 | Withall et al. | 235/384 |
| 4,634,849 | 1/1987 | Klingen | 235/487 |
| 4,647,917 | 3/1987 | Anderson, III et al. | 340/572 |
| 4,711,994 | 12/1987 | Greenberg | 235/384 |
| 4,857,716 | 8/1989 | Gombrich et al. | 235/375 X |
| 4,879,747 | 11/1989 | Leighton et al. | 380/23 |
| 4,991,008 | 2/1991 | Nama | 235/379 X |
| 4,995,081 | 2/1991 | Leighton et al. | 380/23 |
| 5,051,565 | 9/1991 | Wolfram | 235/384 |
| 5,168,150 | 12/1992 | Plouzennec et al. | 235/475 |
| 5,225,990 | 7/1993 | Bunce et al. | 364/478 |
| 5,299,116 | 3/1994 | Bravman et al. | 235/375 |
| 5,313,052 | 5/1994 | Watanabe et al. | 235/375 |
| 5,337,358 | 8/1994 | Axelrod et al. | 380/23 |
| 5,386,103 | 1/1995 | DeBan et al. | 235/379 |
| 5,401,944 | 3/1995 | Bravman et al. | 235/375 |
| 5,469,506 | 11/1995 | Berson et al. | 380/23 |
| 5,478,991 | 12/1995 | Watanabe et al. | 235/375 |
| 5,490,217 | 2/1996 | Wang et al. | 380/51 |
| 5,504,321 | 4/1996 | Sheldon | 235/492 |
| 5,635,012 | 6/1997 | Belluci et al. | 156/277 |
| 5,793,639 | 8/1998 | Yamazaki | 235/384 X |

*Primary Examiner*—Michael G Lee
*Assistant Examiner*—Diane I. Lee
*Attorney, Agent, or Firm*—Fredrikson & Byron, P.A.

[57] ABSTRACT

A system and method for enhancing passenger security in the travel industry by matching passengers with their baggage through storage of images of passengers and their baggage and other textual data in computer memory and in printed codes which may be on passenger baggage, a boarding pass, a positive passenger bag identifier, and a passenger identification card. The codes on boarding passes are scanned at the boarding gate before passengers may board to check whether the passenger image recovered from the code matches that of the passenger attempting to board. The boarding gate scan also generates a passenger manifest which, when compared to the list of passengers who checked baggage, identifies passengers who checked baggage but did not board. Positive passenger baggage match identifiers are generated associating passengers and the coded image of the baggage checked by the passenger. The positive passenger baggage matching identifiers corresponding to the unboarded passengers may be identified, thereby permitting recovery of an image of the unboarded passengers' baggage. The baggage may then be identified visually and removed or inspected prior to departure of the commercial carrier.

7 Claims, 8 Drawing Sheets

SYSTEM AND METHOD FOR MATCHING PASSENGERS AND THEIR BAGGAGE

TECHNICAL FIELD

The present invention relates to a system and method for enhancing security in the travel industry, and more particularly to a system and method for enhancing commercial airline security by matching passengers with their baggage.

BACKGROUND OF THE INVENTION

Recent terrorist activities involving commercial airlines, ocean liners, and other commercial carriers, have created a demand and a public mandate for more effective security solutions to these hazards.

It is believed that "no show" passengers represent one of the major threats to commercial carriers. Such passengers might check baggage containing explosives onto the aircraft through the ticketing agent without ever boarding the aircraft.

Systems have been created which attempt to solve this problem by matching passengers with their luggage. Under these systems, baggage checked by passengers who fail to board the aircraft is identified and removed. However, such security systems require a great amount of time and expense to implement.

SUMMARY OF THE INVENTION

One embodiment of the invention provides a passenger baggage matching system for identifying and facilitating removal from a commercial carrier baggage checked by passengers who fail to board the commercial carrier. This system receives identification information from the passenger and generates and stores a passenger identifier uniquely identifying the passenger. The system generates a boarding pass bearing the passenger identifier in a machine-readable format. The system then generates a positive passenger bag matching identifier correlating the passenger identifier a baggage code encoding an image of the baggage checked by the passenger. The image of the baggage may be recovered from the code and displayed, preferably in color, on a monitor. The system also includes a reader for scanning the passenger's boarding pass before the passenger is permitted to board the commercial carrier. Scanning boarding passes of boarding passengers allows the system to recover and store the passenger identifiers for boarded passengers. The system then compares the boarded passengers' passenger identifiers to the passenger identifiers generated at check-in to identify passengers who checked baggage but failed to board the commercial carrier. Having these passenger identifiers enables a baggage handler to find the positive passenger bag matching identifiers corresponding to the unboarded passengers. From the positive passenger bag matching identifiers, the baggage handler may recover the image of the unboarded passenger's baggage, thereby allowing the checked baggage to be located visually and removed from the commercial carrier.

A further embodiment of the passenger baggage matching system includes a system for matching passengers with their baggage at a baggage claim area. The system generates a baggage tag attachable to a bag and bearing a machine-readable passenger code encoding an image of the bag's owner. The image may be recovered from the code to identify the owner of the bag. Alternatively, or in addition, the system generates a baggage claim tag that is issued to the bag's owner and bears a machine-readable baggage code encoding an image of the bag. The baggage image may be recovered from the code to identify the owner's bag.

DETAILED DESCRIPTION OF THE INVENTION

The drawings depict one preferred embodiment of the system and method for matching passengers with their baggage of the invention. It will be understood, however, that many of the specific details of the passenger baggage matching system and method illustrated in the drawings could be changed, modified or even eliminated in some cases without departing significantly from the spirit of the invention.

Figure 1:
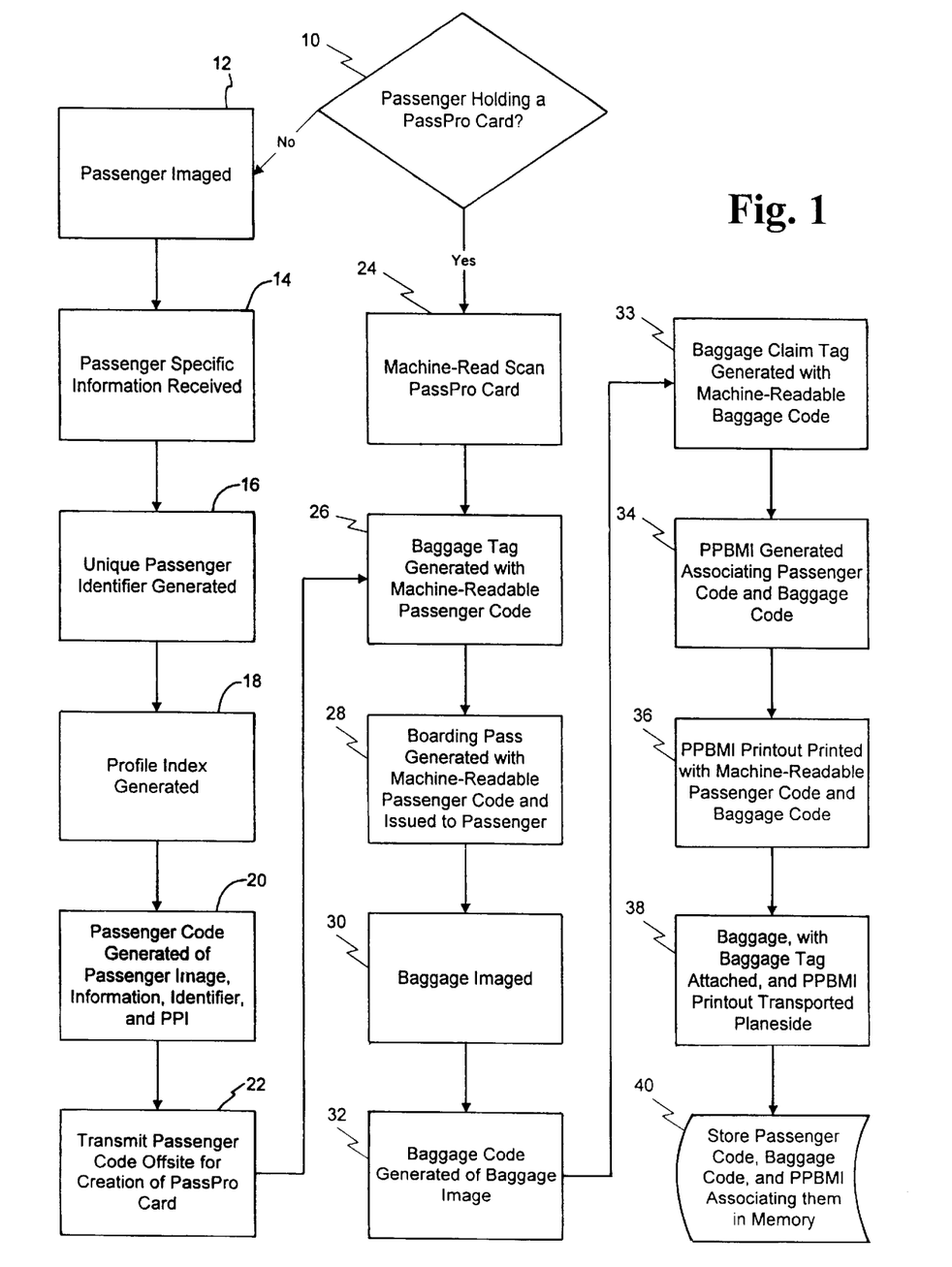
FIG. 1 is a flow chart representation of the passenger ticketing carried out in one operative embodiment of the invention.
Figure 2:
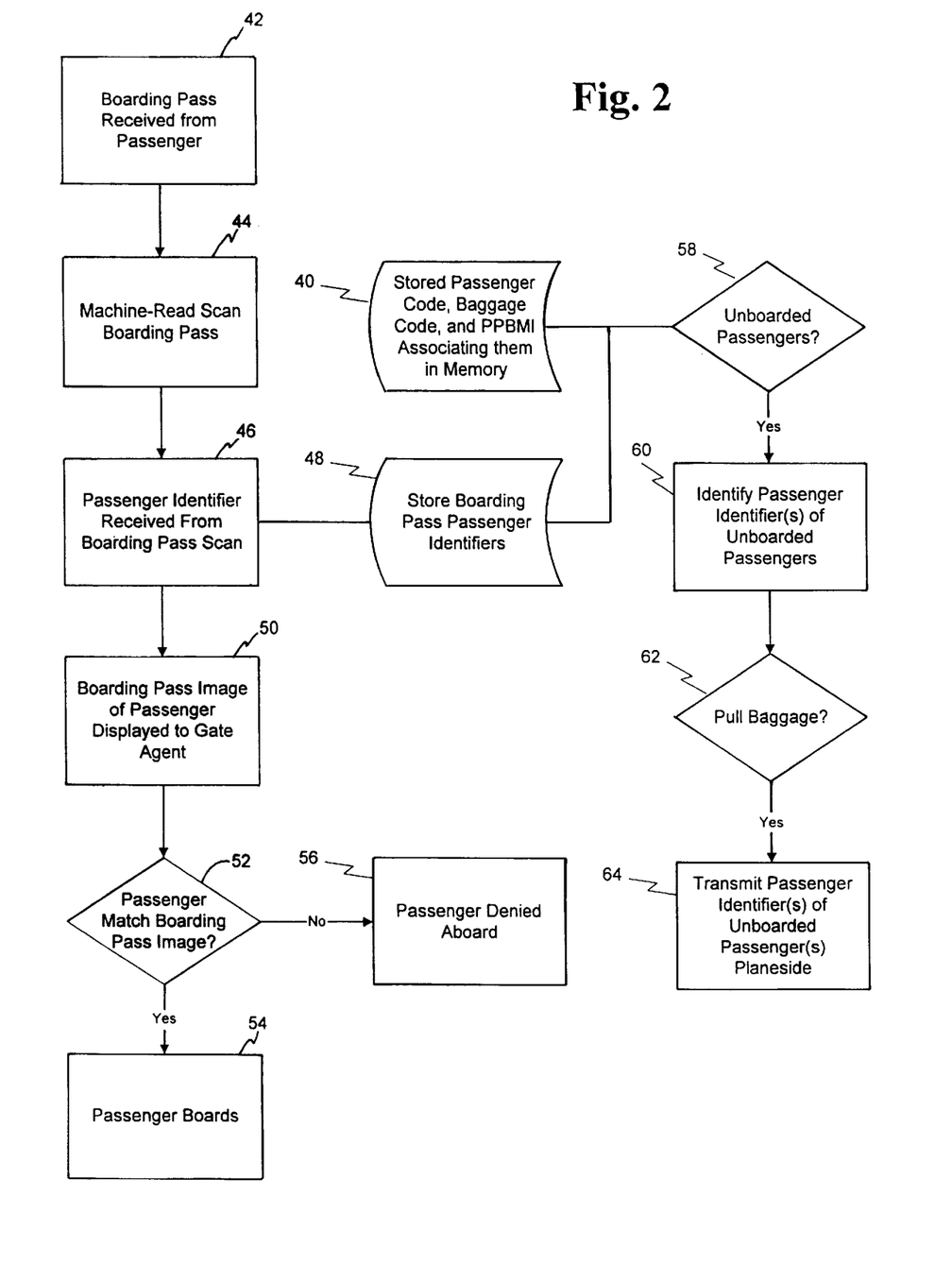
FIG. 2 is a flow chart representation of the boarding gate activities carried out in one operative embodiment of the invention.
Figure 3:
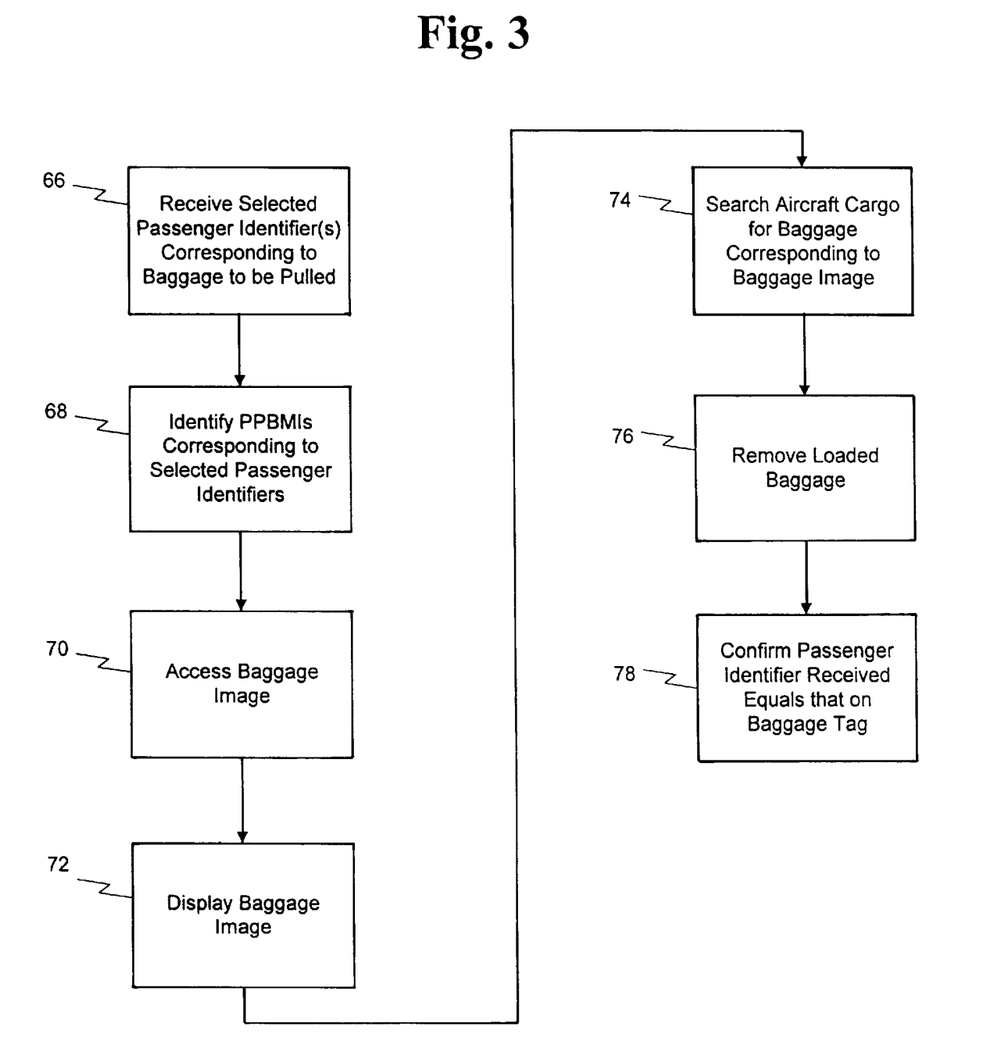
FIG. 3 is a flow chart representation of the activities at planeside carried out in one operative embodiment of the invention.

FIGS. 1–3 are flow chart representations of one embodiment of the system and method for matching passengers of a commercial carrier, such as an airline, with their baggage of the present invention, referred to hereinafter as "PassPro." Referring to FIG. 1, assuming the passenger is not holding a PassPro card, which will be described later, several items of information will be gathered from the passenger during the passenger ticketing process.

Figure 4:
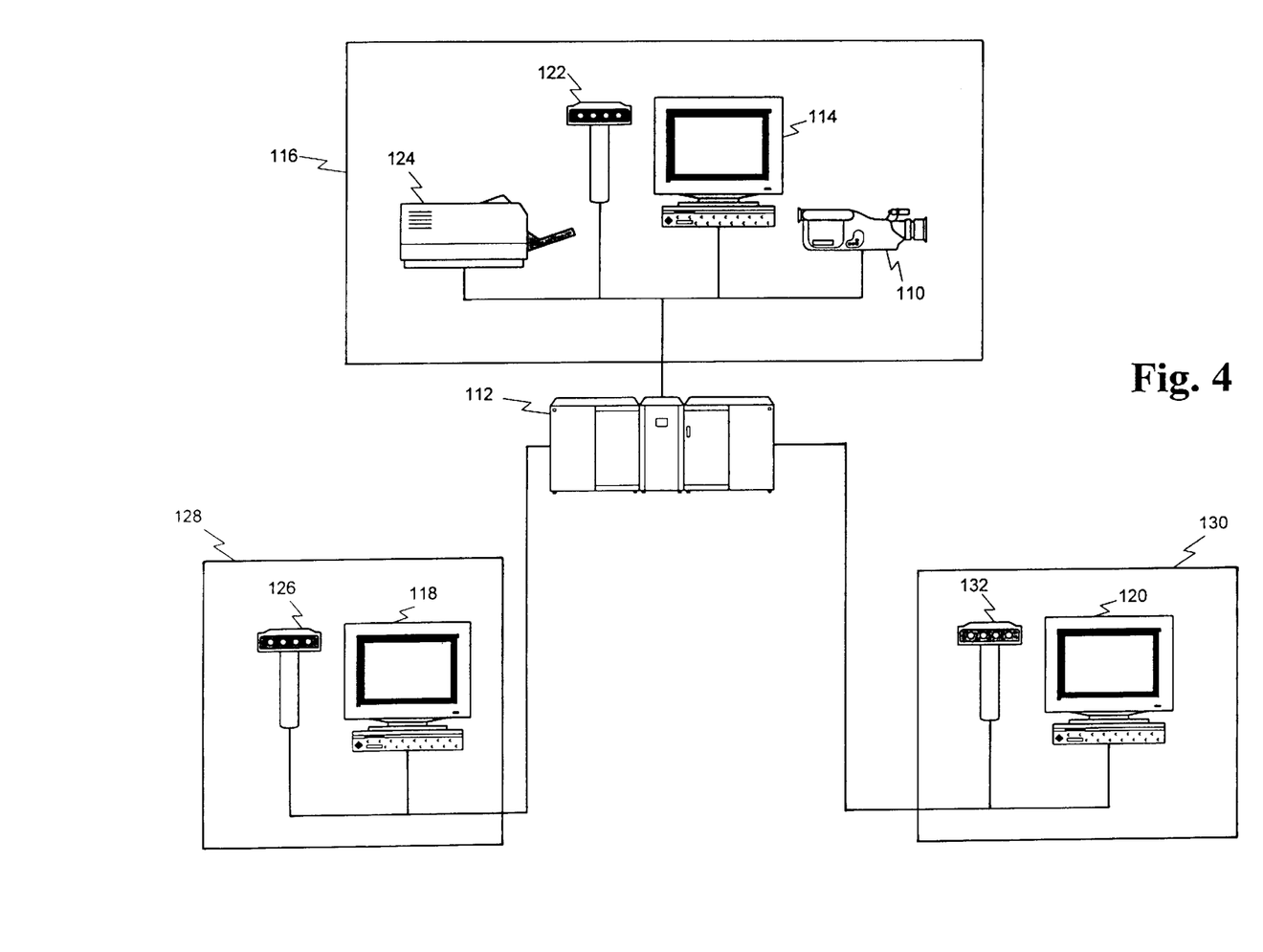
FIG. 4 is a schematic representation of the system of one operative embodiment of the invention.

A snapshot of the passenger's video image is initially captured 12. In one embodiment, a video camera 110, schematically represented in FIG. 4, is trained on the stationary area of the passenger's approach to the ticketing counter. Video camera 110 is typically digital, but may be analog. The video camera 110 feeds the passenger's image to display terminal 114 located at the ticketing counter 116. Display terminal 114 interfaces with computer system 112. Such computer systems are widely used in the art and need not be discussed in detail here. Typically, though, the system will include a network of mainframes with terminals attached, such as those shown schematically as 114, 118 and 120. If so desired, computer system 112 may comprise an airline reservation system computer and a baggage reconciliation system. The computer system 112 may also comprise numerous smaller personal computers networked together.

Besides obtaining flight information, several other items of passenger specific information may be entered 14 into the computer 112. FAA mandates require receipt of government-issued identification from passengers. The government-issued identification may be used to provide passenger information such as name, address, driver's license data, passport information, etc. Automated reader systems such as barcode scanners, magnetic stripe readers or optical character readers may be connected to the computer 112 to streamline this process. Other passenger specific information, such as credit card numbers, medic-alert data, frequent flyer numbers, and meal preferences, may also be received 14.

The computer then generates 16 a unique passenger identifier for identifying the particular passenger. The passenger identifier may be anything which may be used to uniquely identify the passenger, such as their name, an arbitrary alphanumeric string, or a snapshot of the passenger's image.

The computer may optionally use the previously collected information about the passenger to generate 18 a passenger profile index (PPI). The PPI may be some indication of the relative threat of harm which the baggage of the passenger represents to the aircraft. The PPI determination can be based on various objective criteria, such as whether the passenger paid cash or is a frequent flyer. The PPI may also be based on known systems for identifying high-risk persons, such as the Computer Assisted Passenger Screening (CAPS) program developed by the U.S. Federal Aviation Administration and Northwest Airlines. Baggage with a relatively high passenger profile index is more likely to be removed from the aircraft's cargo hold if the corresponding passenger does not board the aircraft.

The passenger image, identifying information, passenger identifier, and optionally the PPI are encoded 20 into a passenger code, comprising a standard format for holding the passenger data.

Figure 5:
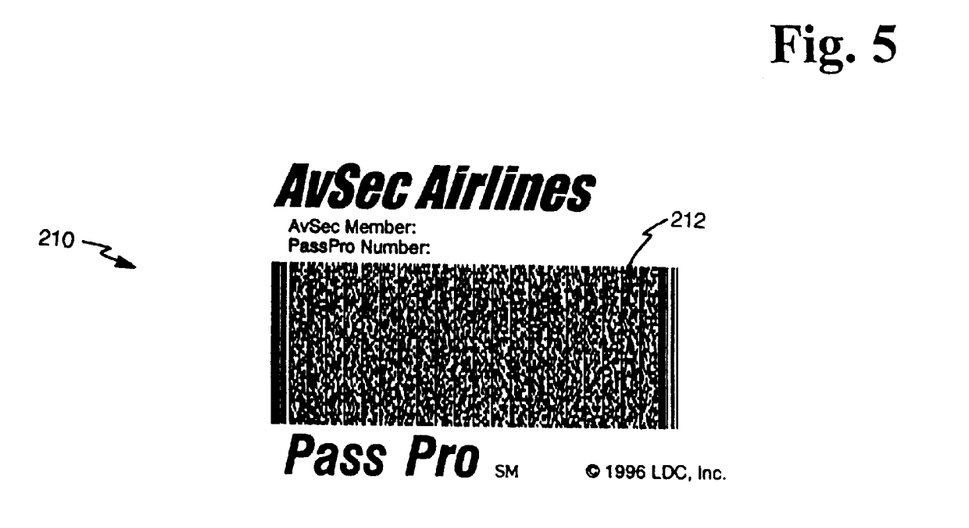
FIG. 5 is a representation of a PassPro card for use in accordance with one operative embodiment of the invention.

The passenger code may also be transmitted offsite for creation of a PassPro card 210, as shown in FIG. 5. The PassPro card 210 is an inexpensive and durable laminated card bearing the passenger code 212. The passenger code, like the other machine-readable codes described below, may be printed in a standard machine-readable format, such as Symbol Technologies public domain format PDF417 two-dimensional barcode. This standard barcode format may be produced using Symbol Technologies' publicly available software. Machine-readable formats, other than two-dimensional barcodes, may be used. Once created, the PassPro card 210 may be mailed to the passenger's home address.

Although use of the PassPro card is optional, the check-in process is streamlined for passengers holding a PassPro card 210. Passengers holding 10 a PassPro card can bypass steps 12, 14, 16, 18, 20, and 22 of the invention, proceeding directly to step 24. At step 24, a code scanner 122, shown schematically in FIG. 4 and connected to the computer 112, scans the PassPro card passenger code 212 to collect passenger information. A two-dimensional barcode reader may be used for all codes printed in this format. Although steps 10 through 24 typically occur at the airline ticketing counter, they may also be undertaken in advance of the travel at a travel agency.

Figure 6:
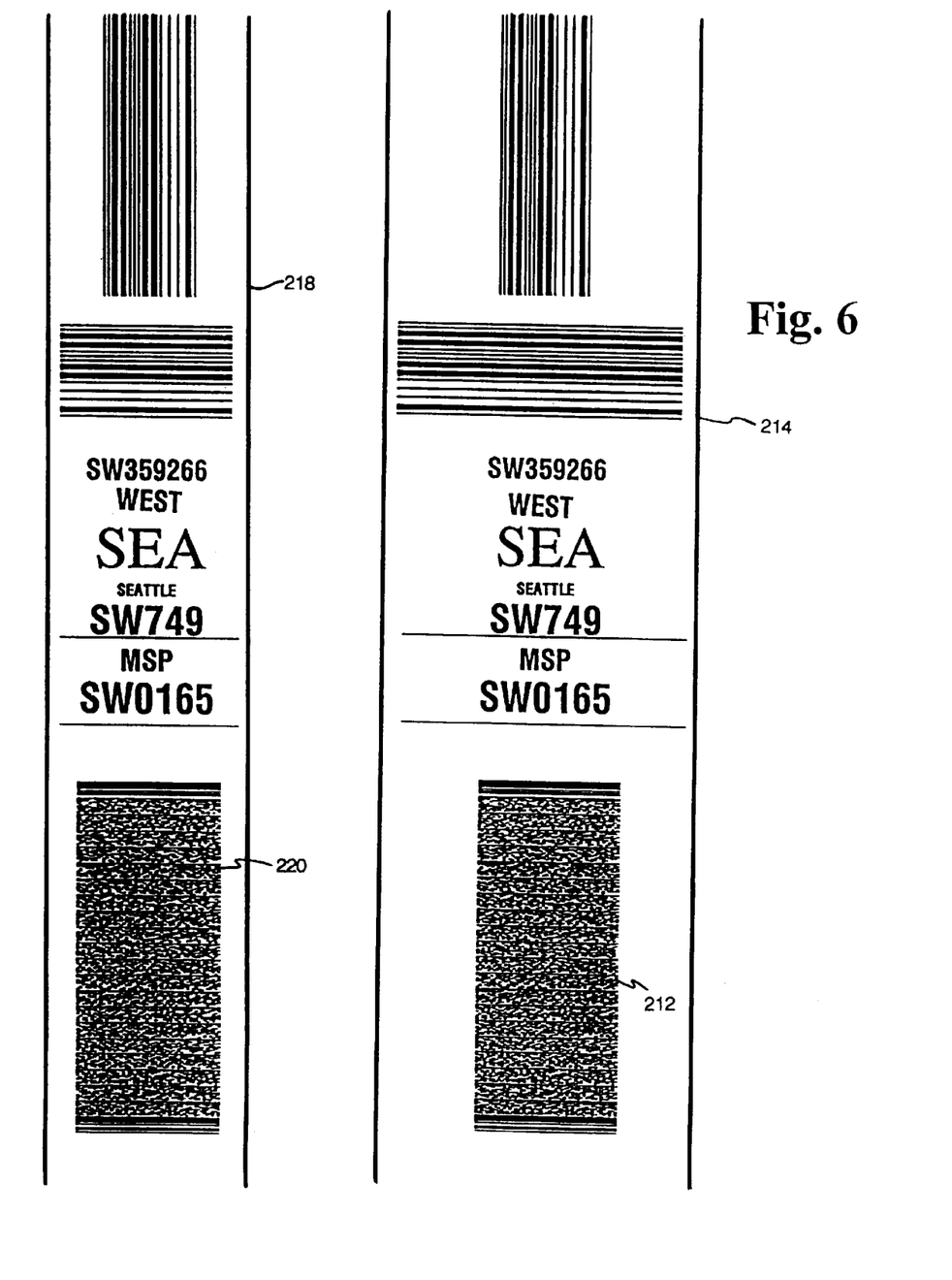
FIG. 6 is a representation of a baggage tag and a baggage claim tag for use in accordance with one operative embodiment of the invention.
Figure 7:
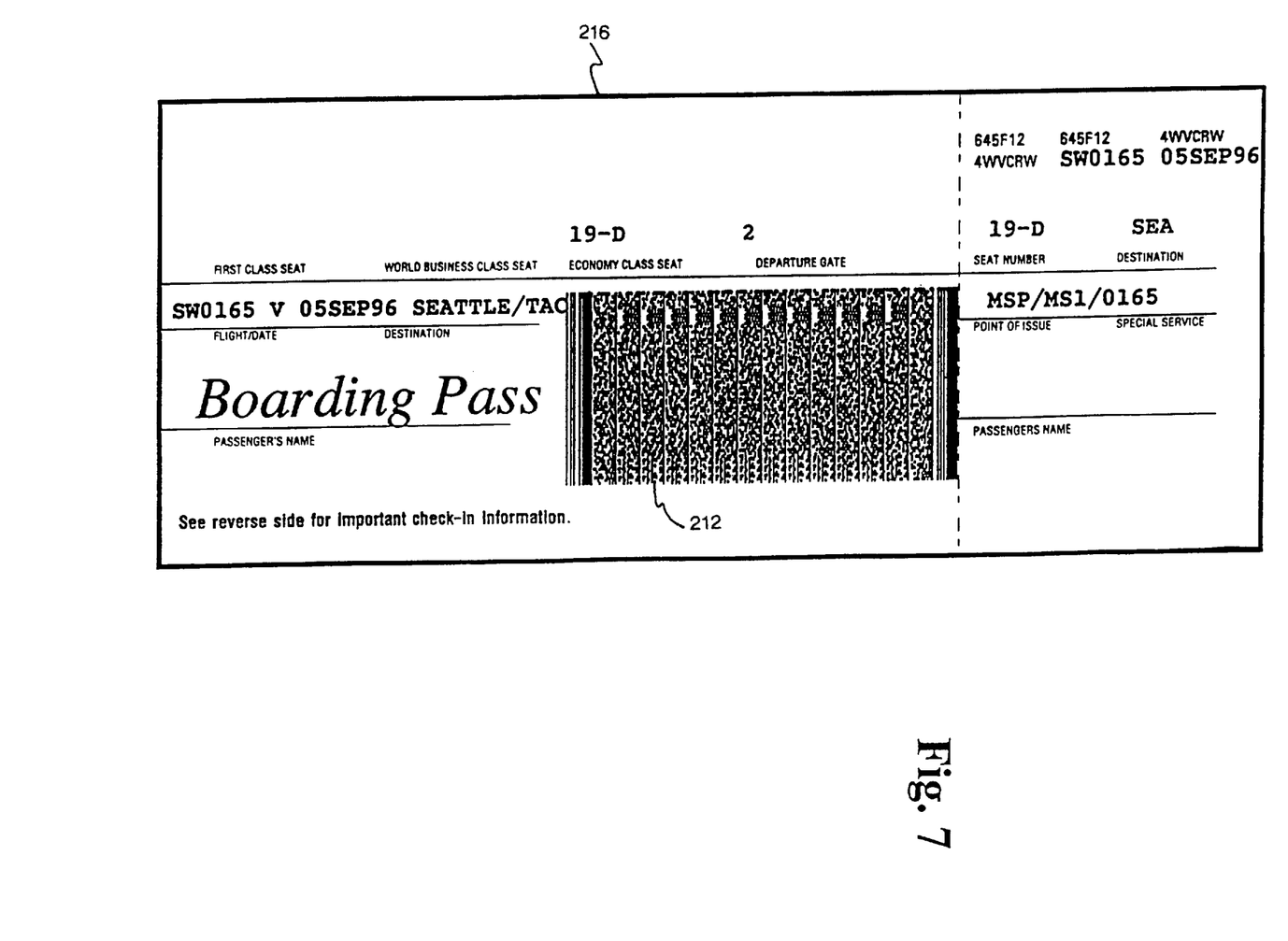
FIG. 7 is a representation of a boarding pass for use in accordance with one operative embodiment of the invention.

With or without use of a PassPro card 210, the PassPro system generates 26 a baggage tag 214, as shown in FIG. 6, and generates 28 a boarding pass 216, as shown in FIG. 7, each bearing the passenger code 212 in machine-readable format. A printer 124, schematically shown in FIG. 4, is used to print the baggage tag 214 and the boarding pass 216.

Similar to obtaining the passenger's image, the PassPro system obtains 30 a video image of the passenger's baggage in the ticketing counter bag well and generates 32 a baggage code of the image. The PassPro system then generates 33 a baggage claim tag 218 bearing the baggage code 220 printed in machine-readable format, as shown in FIG. 6. The baggage claim tag is issued to the passenger. As discussed below, the baggage code 220 on the claim tag 218 aids baggage identification when the passenger claims the baggage or when the airline searches for the baggage if it becomes lost.

The PassPro system next generates 34 a positive passenger bag match identifier (PPBMI) which correlates the baggage code 220 to some means of identifying the passenger. This means may be only the passenger's passenger identifier. Preferably, though, the PPBMI correlates the baggage code 220 to the passenger's code 212, containing the passenger's image, passenger identification, passenger identifier, and PPI.

Figure 8:
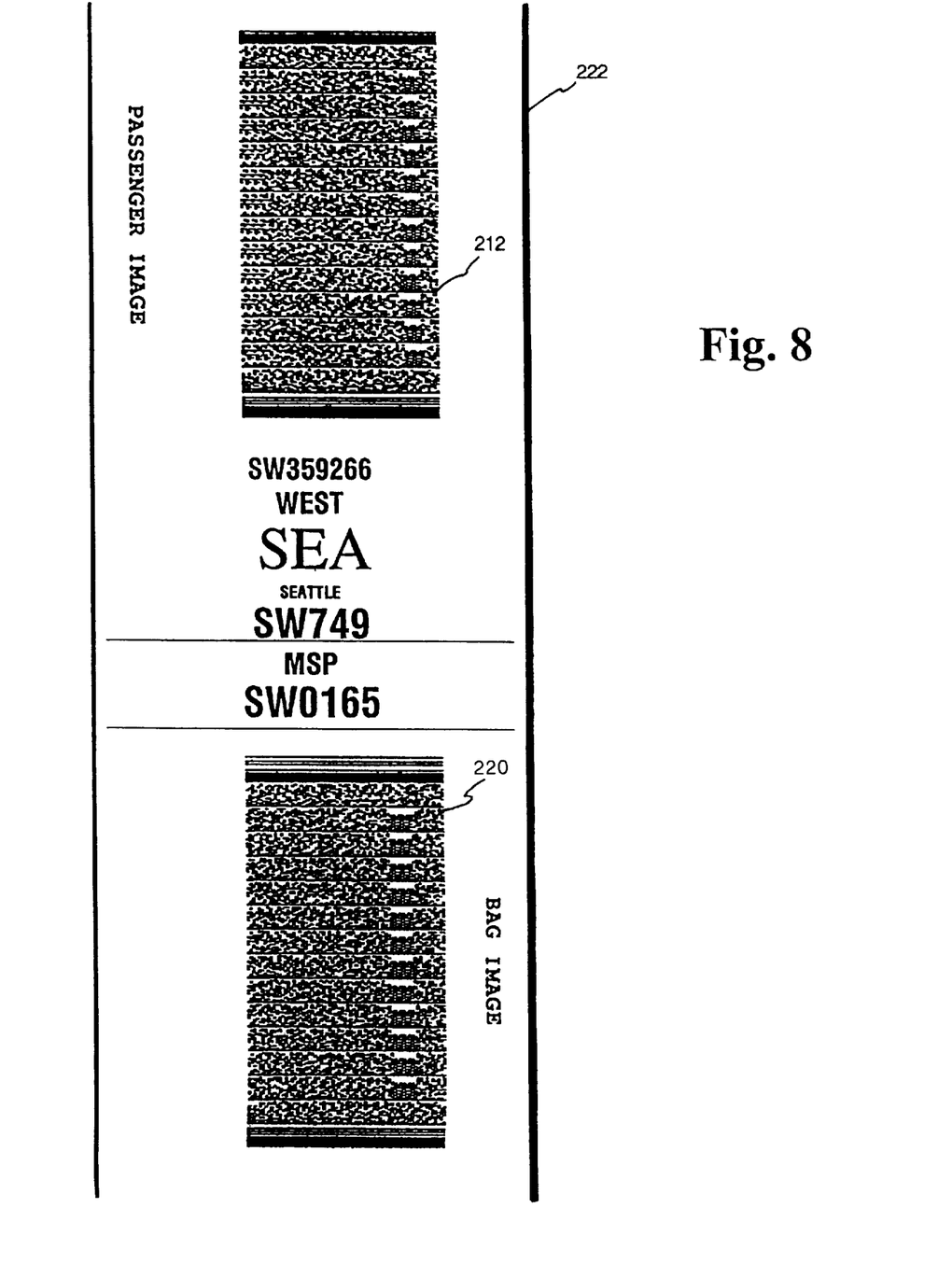
FIG. 8 is a representation of a Positive Passenger Bag Matching Identifier printout for use in accordance with one operative embodiment of the invention.

The PassPro system next prints 36 the Positive Passenger Bag Match Identifier (PPBMI) 222 (shown schematically in FIG. 8) on printer 124 (shown schematically in FIG. 4) bearing the baggage code 220 and the passenger code 212. Correlating the baggage code 220 with some indicia of identification of the passenger is critical to matching passengers and their baggage. The correlation may occur physically, such as printing both on one PPBMI printout 222, or within computer memory, by associating the passenger and baggage codes with the same passenger identifier.

The PPBMI printout 222 and the baggage with the baggage tag 214 attached are both transported 38 to baggage handling personnel located at planeside. The passenger code, including the passenger identifier, the baggage code, and the PPBMI, correlating the passenger and baggage codes, is retained 40 in memory for later use.

As normally occurs at the boarding gate, as shown in FIG. 2, a gate agent receives 42 a boarding pass from each passenger. Under the PassPro system, the gate agent also scans 44 the passenger code printed on the boarding pass with a scanner 126 before the passenger boards at the boarding gate 128, as suggested in FIG. 4. The passenger identifier, contained within the passenger code, is received 46 and stored 48 by the airline computer system 112 from this scan. The accumulation of these passenger identifiers creates an accurate passenger manifest.

As an added security measure, the scan 44 of the boarding pass may also recover the image of the passenger from the passenger code printed thereon. The recovered image is displayed 50, preferably in color, on a computer monitor 118 for the gate agent to observe. Before allowing the passenger to board 54, the gate agent may then determine 52 whether the passenger attempting to board is the same person who was issued the boarding pass 28. If the passenger does not match the image displayed, the passenger is denied 56 access aboard the aircraft and their passenger identifier is deleted from the manifest.

The PassPro system may identify 58 unboarded passengers in several ways. Preferably, the lists of passenger identifiers for boarded passengers 48 and for checked-in 40 passengers are communicatively linked within the computer 112. Thus, the PassPro system may continuously compare these lists to identify 60 the passenger identifiers of passengers checked-in but not yet boarded.

Alternatively, the lists of passenger identifiers for boarded passengers 48 and for checked-in passengers 40 may be distinct and the comparison performed on a batch basis when the lists are linked. For instance, instead of storing 40 the passenger identifiers of passengers who checked-in at the ticketing counter, this list of passenger identifiers may be generated at planeside from a scan of the baggage tags 214 by a code scanner 132 as the baggage is loaded on board. The list of passenger identifiers generated by this process may be transported or transmitted to the boarding gate for linkage with the passenger manifest 48 after all the bags are loaded.

Under a second alternate scenario, the stored passenger manifest 48 is transmitted or transported planeside before the bags are loaded. The baggage handler does not load a piece of baggage unless its corresponding passenger identifier is listed in the passenger manifest 48.

Following the preferred scenario where the two lists are communicatively linked, the appropriate airline personnel must determine 62 whether to pull the unboarded passengers' baggage before the plane departs the gate. If appropriate airline personnel determine that the baggage should be removed, the passenger identifiers corresponding to the unboarded passengers are transmitted 64 to baggage handlers planeside. The passenger identifier may be transmitted planeside 130 through the computer system 112 or via some other communications link.

As shown in FIG. 3, the baggage handler receives 66 the passenger identifiers corresponding to the baggage to be removed from the aircraft. The baggage handler may use the stored PPBMIs to identify 68 and access 70 an image of the baggage to be removed. From terminal 120, the baggage handler may query the stored PPBMIs for the PPBMIs corresponding to the passenger identifiers of the unboarded passengers. The PPBMIs will then identify the unboarded passenger's corresponding baggage code. From the identified baggage code, the baggage handler may recover an image of the baggage.

Alternatively, since the baggage handler has the PPBMI printouts 222 planeside, the baggage handler may manually identify 68 the PPBMI printouts 222 bearing the selected passenger identifiers. The baggage handler may identify the corresponding PPBMIs by reading the passenger identifiers printed in either human-readable form or machine-readable form. The baggage handler may read the machine-readable codes by scanning the PPBMIs with a code scanner 132 to display the codes on the terminal 120.

Once the proper PPBMI printouts bearing the unboarded passengers' passenger identifiers are found, the scan of the PPBMI can also recover the PPI assigned to the unboarded passengers baggage. The higher the passenger risk as indicated by the passenger's PPI, the more likely the baggage should be removed from the aircraft or more thoroughly inspected (e.g. manually or by a bomb scanner) before departure. Finding a low PPI, the baggage handler and/or the gate agents may decide not to remove the baggage from the aircraft. Turning to FIG. 3, if the baggage is to be removed, the baggage handler may scan 70 the baggage code 220 on the PBMI with the code reader 132 to display 72 the image of the baggage, preferably in color, on the terminal 120.

Proceeding under either the computer search or the manual search of the PPBMIs, by first visualizing an image of the baggage the baggage handler can save a considerable amount of time locating 74 the baggage in the cargo hold. Without an image of the baggage, the baggage handler must check the baggage tag on every bag until the proper one is located.

Armed with an image of the baggage and its relative location within the cargo hold, the baggage handler may quickly see and remove 76 the baggage from the aircraft's cargo hold. The baggage handler may confirm 78 that the proper baggage was removed by reading the passenger identifier (either visually or with the code scanner) from the baggage's attached baggage tag 214. The bag may then be further inspected by passing it through an x-ray machine or a bomb scanner.

A further embodiment of the invention also provides a method and system to match passengers with their baggage at a baggage claim area. The method and system are similar to that used by gate agents to prevent passengers not matching their boarding pass image from boarding. Before baggage may be removed from the baggage claim area, a baggage claim agent scans the passenger code 212 printed on the attached baggage tag 214. The system recovers and displays the image of the passenger who checked 14 the baggage. Unless the person removing the baggage from the claim area matches the displayed image, the gate agent may restrict removal of the baggage.

In addition to (or in the alternative to) scanning the baggage tag to match a passenger to his or her baggage, the baggage claim agent may scan the baggage code 220 on passenger's baggage claim tag 218. By scanning the baggage claim tag 218, the system recovers the image of the passenger's baggage and displays it, preferably in color, to the claim agent. Unless the baggage being removed from the claim area matches its image, the gate agent may restrict the passenger's removal of the baggage.

If so desired, the baggage claim process can be substantially automated, essentially eliminating the need for a baggage claim agent. In such an embodiment, an exit of the baggage claim area would be provided with an automated turnstile or gate to prevent people from exiting without authorization. The baggage tag 214 in this embodiment (not illustrated) would optimally have the baggage code 220 printed thereon either instead of or, more preferably, in addition to the passenger code 212. Once the passenger had collected his or her baggage, he or she would approach the turnstile and would scan the baggage code 220 on the baggage tag 214 and the same code on the baggage claim tag 218 through a scanner associated with the turnstile. If the scanned baggage codes matched, the turnstile would open, permitting the passenger to leave the baggage claim area with his or her luggage. If the codes did not match, the turnstile would remain locked and the passenger would have to go to a different exit from the baggage claim area and talk with a baggage claim agent.

The passenger's baggage claim tag 218 may also be used to more easily locate lost baggage. Armed with an image of the lost baggage, recovered from a scan of the passenger's claim tag 218, baggage handlers can search unclaimed baggage visually, thereby narrowing the number of bags to be searched. In addition, a facsimile of the baggage image may be transmitted electronically to assist searches at other airports.

While a preferred embodiment of the present invention has been described, it should be understood that various changes, adaptations and modifications may be made therein without departing from the spirit of the invention.

What is claimed is:

1. A method for identifying and facilitating removal from a commercial carrier baggage checked by passengers during a check-in process who fail to board the commercial carrier, comprising:

receiving information identifying a passenger checking baggage to be stowed on the commercial carrier;

generating a passenger identifier uniquely identifying the passenger, the passenger identifier comprising an image of the passenger and passenger identification data;

storing the generated passenger identifier;

generating a boarding pass bearing the passenger identifier corresponding to the passenger in a machine-readable format;

generating a baggage code during the check-in process encoding an image of the baggage checked by the passenger, the baggage code enabling recovery and display of the image of the checked bag;

correlating the passenger identifier with the baggage code;

reading the passenger identifier from the boarding pass of passengers who board the commercial carrier;

storing the boarded passenger identifiers;

comparing the stored boarded passenger identifiers against the stored generated passenger identifiers to identify the passenger identifier of any non-boarding passenger who checked baggage but did not board the commercial carrier;

recovering the image of baggage from baggage codes correlated to passenger identifier of each such non-boarding passenger; and using the recovered image or images, visually identifying such non-boarding passengers' checked baggage to facilitate removal of such baggage.

2. The method of claim 1 further including reading the passenger identifier before a passenger is permitted to board the commercial carrier and recovering and displaying the associated image, thereby permitting an operator to determine whether the recovered image of the passenger matches the passenger.

3. The method of claim 1, wherein the passenger identifier comprises data personal to the passenger.

4. The method of claim 3, further comprising generating a reusable passenger profile card imprinted with the passenger identifier in a machine-readable format.

5. The method of claim 1, wherein the passenger identifier uniquely identifying a passenger comprises an alphanumeric string unique to the passenger baggage matching system.

6. The method of claim 1, further including assigning a passenger profile index to the baggage of the passenger, the index generated from the information received identifying the passenger and indicating the relative risk of harm which the baggage of the passenger represents to the commercial carrier, whereby baggage with a relatively high passenger profile index is more likely to be removed from the commercial carrier if the corresponding passenger does not board the commercial carrier.

7. The method of claim 1, wherein the correlation of the passenger identifier with the baggage code comprises printing a positive baggage matching identifier bearing a printout of the passenger identifier and a printout of the baggage code printed in a machine-readable format.

* * * * *